May 2, 1967   E. F. WEBB   3,317,694
COMBINATION SWITCH AND CIRCUIT BREAKER
Filed March 10, 1965   2 Sheets-Sheet 1

INVENTOR
EDMOND F. WEBB
BY
Rudolph L. Powell
ATTORNEY

May 2, 1967   E. F. WEBB   3,317,694
COMBINATION SWITCH AND CIRCUIT BREAKER
Filed March 10, 1965   2 Sheets-Sheet 2
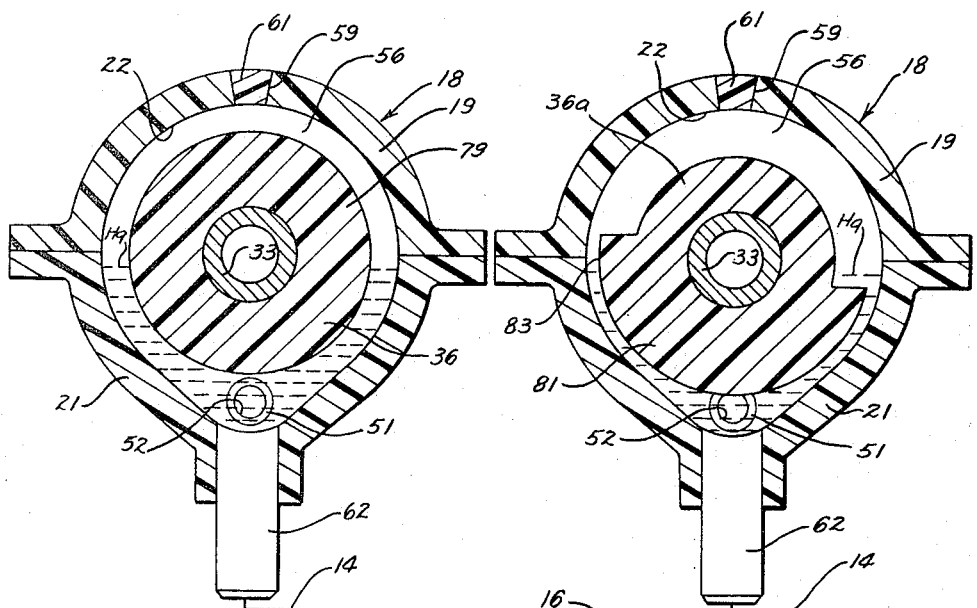
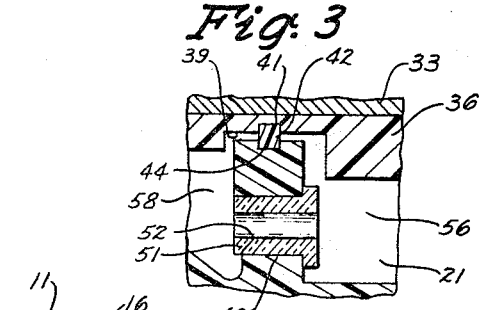
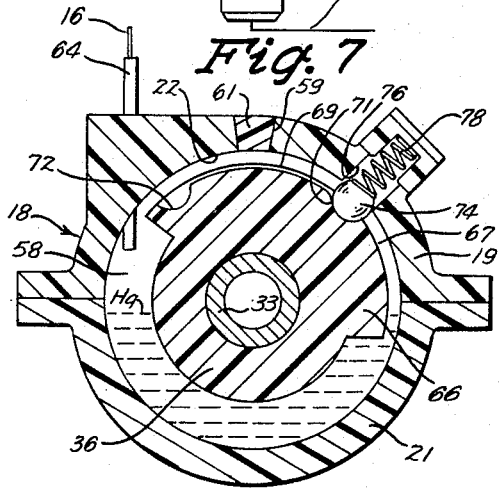
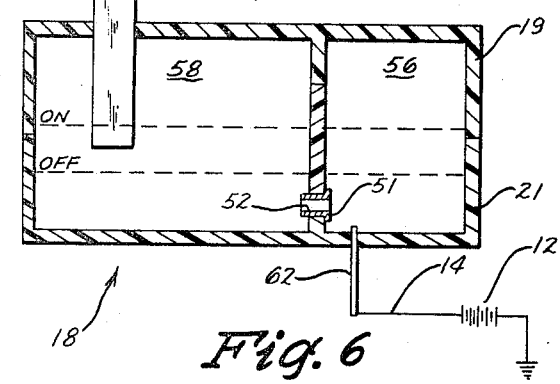
INVENTOR
EDMOND F. WEBB
BY
Rudolph L. Lowell
ATTORNEY

United States Patent Office 3,317,694
Patented May 2, 1967

3,317,694
COMBINATION SWITCH AND CIRCUIT BREAKER
Edmond F. Webb, Franklin, Mich., assignor, by mesne assignments, to Putnam Equipment Corporation, Cookeville, Tenn., a corporation of Tennessee
Filed Mar. 10, 1965, Ser. No. 438,568
9 Claims. (Cl. 200—152)

This invention relates to a control unit for an electrical circuit and more particularly to a combined mercury switch and circuit breaker.

It is the object of this invention to provide an improved switch and circuit breaker for use in an electric circuit.

Another object of the invention is to provide an electric switch having a plurality of bodies of a liquid current conductor employed for the purpose of positively opening and closing the switch.

A further object of the invention is to provide a combined switch and circuit breaker which is manually operable to open and close an electric circuit and which will automatically open the electric circuit when subjected to a current overload.

Still another object of the invention is to provide an electric mercury switch which is not sensitive to vibrations or external shocks nor affected by changes in the level of the switch.

An additional object of the invention is to provide a compact control unit for an electric circuit which is sturdy in construction, economical to manufacture, and reliable in operation.

These and other objects will be apparent from reference to the following description and the accompanying drawing, wherein:

FIG. 3 is an enlarged sectional view taken along the line 3—3 of FIG. 1;

FIG. 4 is an enlarged sectional view taken along the line 4—4 of FIG. 1;

FIG. 5 is an enlarged sectional detail view of a circuit breaker for the control unit shown in FIG. 2;

FIG. 6 is a schematic electrical diagram of the control unit; and

FIG. 7 is an enlarged sectional view similar to FIG. 3 showing a modified sleeve section.

Figure 1:
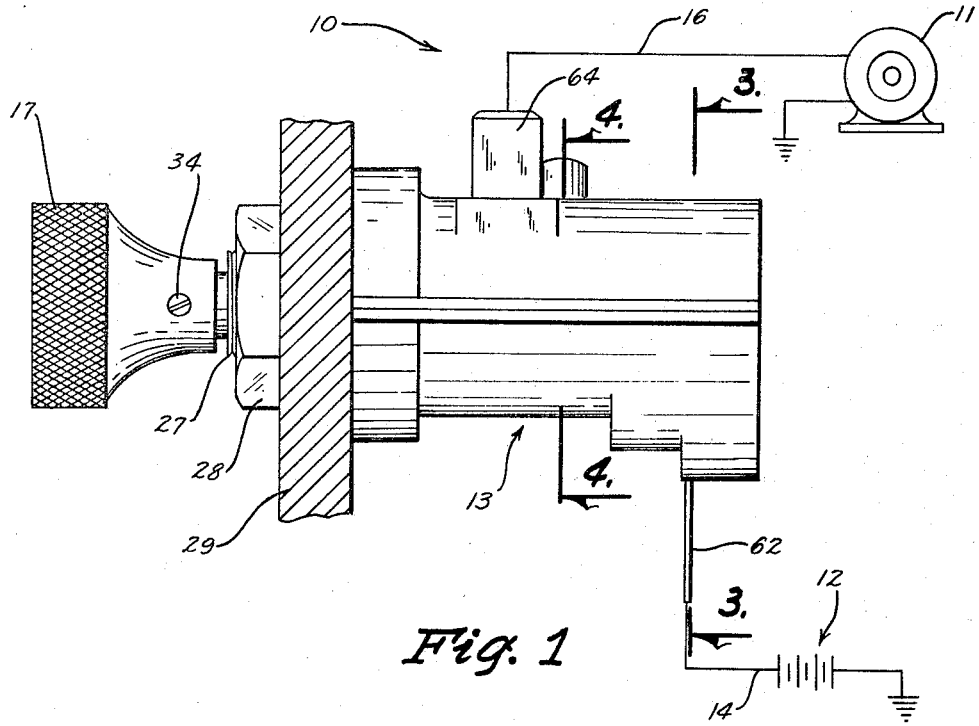
FIG. 1 is a side elevational view of the control unit of this invention illustrated as applied to a motor, the electric circuit being diagrammatically shown.

Referring to the drawing, there is shown in FIG. 1 an electric circuit 10 for an electric motor 11. Included in the circuit 10 is a battery 12 and the control unit 13 of this invention. A line 14 electrically couples the battery 12 to the control unit 13 and a line 16 electrically couples the control unit 13 to the electric motor 11. The circuit is completed by the connection of both the motor 11 and battery 12 to ground. The electric motor 11 may be used to operate the windshield wipers of an automobile.

The control unit 13 has a knob 17 which is manually rotatable to off and on positions to open and close the circuit of the motor 11. When the knob 17 is in the on position the battery 12 is electrically connected to the motor 11 resulting in the operation of the motor. Movement of the knob 17 to the off position disconnects the motor 11 from the battery 12.

Figure 2:
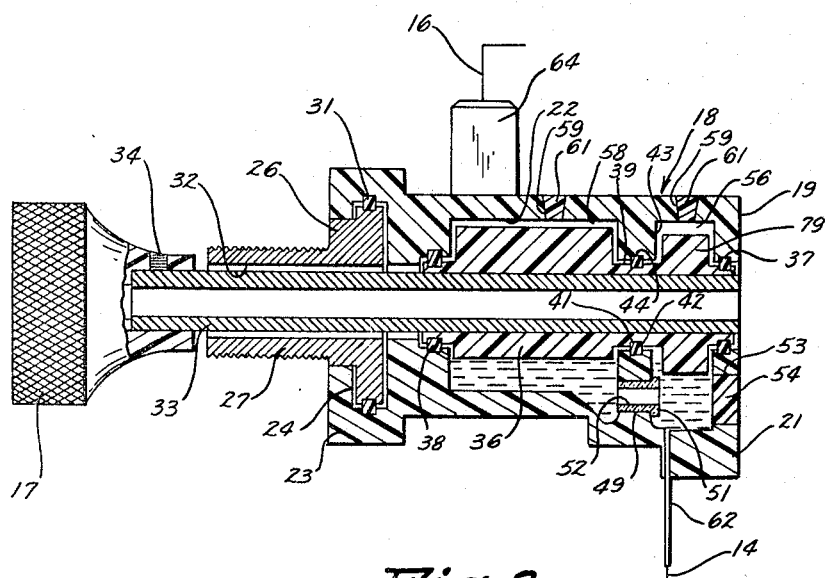
FIG. 2 is a longitudinal sectional view of the control unit of FIG. 1.

As shown in FIG. 2, the control unit 13 comprises a housing 18 formed from an electrically insulative plastic material. The housing 18 is of a two-piece cast construction having an upper section 19 and a lower section 21 which are heat sealed together to form a unitary structure having a longitudinally extended bore 22 having axially extended sections of varying diameters. The housing 18 has an enlarged end 23 wherein the bore 22 is formed with an annual recess 24. A metal insert 26, seated within the bore and in the recess 24, has a body section 27 projected axially away from the housing 18. The peripheral surface of the body section 27 has external threads which cooperate with a nut 28 to secure the entire control unit 13 on a support 29 (FIG. 1) such as the instrument panel of an automotive vehicle.

An annular seal 31 of resilient material is seated in the peripheral wall of the recess 24 and is in engagement with a peripheral portion of the insert 26.

The insert 26 has an axial bore 32 for accommodating a tubular shaft 33 extended longitudinally through the bore 22 of the housing 18. The shaft 33, which may be of a solid construction, projects outwardly from the insert 26 and carries the knob 17. A set screw 34 threaded radially into the knob 17 engages the shaft 33 to fix the knob on the shaft.

Positioned in the bore 22 of the housing 18 is a cam rotor or sleeve of electrically insulative material indicated generally by the reference number 36. The shaft 33 extends longitudinally through the sleeve 36 and is fixedly secured thereto. The opposite end sections of the sleeve 36 are of a reduced diameter and carry annular fluid seals 37 and 38 which cooperate with the end walls of the housing 18 to rotatably mount the rotor 36 and shaft 33 on the housing 18 and to seal the opposite ends of the rotor relative to the bore 22.

The rotor 36 has an annular groove 39 formed in the bottom thereof with a recess 41 for receiving an annular seal 42. The section of the peripheral wall of the bore 22 adjacent the groove 39 has an inwardly directed annular wall 43 having an annular groove 44 for receiving the outer peripheral portion of the seal 42.

The section of the wall 43 in the lower housing section 21 has a longitudinally extended hole 49 for receiving a tubular member 51 having a bore 52. The tubular member 51 is formed from electrically insulative material which is heat resistant, such as a ceramic material.

The end wall of the housing 18 adjacent the tubular member 51 has an opening 53 which is normally closed by removable plug 54. The opening 53 is in alignment with the opening 49 in the wall 43 and is of a diameter sufficiently large to permit the insertion of the tubular member 51 into the hole 49. The tubular member 51 may be removed and replaced with a similar member by merely removing the plug 54 and rotating the rotor 36 to provide access to the member 51.

The annular groove 39 of the sleeve 36 and the annular wall 43 in the bore 22 divides the bore 22 into separate liquid confining chambers 56 and 58. As shown in FIG. 2 the chamber 56 is substantially one-third the size of the chamber 58. The housing 18 and sleeve 36 may be axially extended to increase the number of separate chambers as disclosed by applicant's copending U.S. patent application Ser. No. 367,943 filed May 18, 1964.

The upper housing section 19 has a pair of holes 59 corresponding to the chambers 56 and 58 and form passages through which a liquid current conductor, such as mercury, may be placed in the respective chambers. Plugs 61 are positioned in the holes 59 to close the respective chambers.

Positioned within each chamber 56 and 58 is a predetermined quantity of mercury partially filling the chambers. An inert fluid, such as oil or glycerin, is positioned on top of the mercury in each of the chambers. The inert fluid functions to prevent arcing of electrical current in air and thereby reduces the oxidation of the mercury in the chambers.

As shown in FIG. 3, a first metal electrode 62 carried by the lower housing section 21 extends into the bottom of the chamber 56. The electrode 62 is connected to the line 14 which is coupled to the battery 12. Referring to FIG. 4 there is shown a second metal electrode 64 carried by the upper housing section 19 and extended into the top portion of the chamber 58. Line 16 is connected to the electrode 64.

The electrodes 62 and 64 are electrically coupled to each other by the mercury in the chambers 56 and 58 when the level of the mercury in chamber 58 is raised into physical contact with the conductor 64. This is achieved by positively displacing the mercury in chamber 58 into engagement with the electrode 64.

Referring to FIG. 4, it is seen that a portion of the sleeve 36 positioned in the chamber 58 has an enlarged arcuate section 66 with a peripheral surface 67 complementary to the adjacent surface of the bore 22 and spaced therefrom. The outer peripheral surface 67 of the arcuate section 66 has a groove 69 and angularly spaced recesses 71 and 72 which coact with a ball 74 to establish on and off indexed positions of the sleeve 36. The ball 74 extends into a bore 76 in the upper housing 19 and engages the sleeve 36. A spring 78 is seated in the bore 76 and engages the ball 74 biasing it into locking engagement with the sleeve 36. As shown in FIG. 3, the sleeve 36 has an enlarged cylindrical section 79 positioned in the chamber 56 which is spaced from the adjacent surface of the housing bore 22.

The chambers 56 and 58 (FIG. 5) are electrically coupled with a small canal of mercury positioned in the bore 52 of the tubular member 51. The mercury in the bore 52 has a definite cross sectional area which is relatively small and therefore has a limited current carrying capacity. This current carrying capacity is determined by the length and diameter of the bore 52. When a small canal of mercury is incorporated in an electric circuit it will automatically break at a definite current value determined by the current carrying capacity of the canal of mercury. When the current flowing through the mercury exceeds the selected maximum value the mercury in the bore 52 will vaporize breaking the electrical connection between the chambers 56 and 58, thereby uncoupling the battery 12 with the motor 11. The gaseous mercury in the bore 52 interrupts the continuity of the metallic mercury thereby breaking the electrical circuit and minimizing the generation of heat. The tubular member 51 being formed from a ceramic material confines the heat to a limited area and inhibits the condensation of all or part of the mercury vapor thereby prolonging the re-establishing of the circuit. Thus the confining of the heat to the area surrounding the bore 52 and the high surface tension of the mercury prevents the mercury from automatically flowing back into the relatively small bore 52.

In order to re-establish the circuit, the mercury in chambers 56 and 58 must have continuity which can only be achieved through the small bore 52. The mercury in chambers 56 and 58 will flow into the bore 52 under the influence of gravity when a differential head of the mercury is effected in the chambers 56 and 58 or when the mercury is subjected to agitation and vibration. A variation in the hydrostatic head of the mercury in the chambers 56 and 58 takes place by virtue of the enlarged arcuate section 66 of the rotor 36 being moved into and out of the mercury. Movement of the arcuate section 66 into the pool of mercury also acts to agitate and vibrate the mercury. Additional vibrations are transmitted to the respective pools of mercury by the coaction of the spring biased ball 74 with the recesses 71 and 72.

As shown in FIG. 6, when the switch 13 is in the off position the mercury in chamber 58 is at a low level and does not contact electrode 64. When the switch has been moved to the indexed on position, the mercury level in the chamber 58 is raised placing the mercury in physical contact with the electrode 64. The cylindrical section 79 in the chamber 56 takes up space and aids in effecting a greater rise in the mercury level on rotation to the on position. Current from the battery 12 is then conducted by the electrode 62 to the mercury in chamber 56 and the restricted volume of mercury in the bore 52 electrically couples the chamber 56 to the chamber 58. Since the mercury in the chamber 58 is in physical contact with the electrode 64 the circuit to the motor 11 is complete. The current carrying capacity of this circuit is determined by the physical dimensions of the bore 52. When the motor 11 is subjected to an electrical overload the restricted amount of mercury in the passage 52 will vaporize with the result that the circuit of the motor 11 will open.

A modification of the configuration of the sleeve 36 within the chamber 56 is illustrated in FIG. 7. Like numerals are used to describe like structure previously described. Instead of the cylindrical section 79 of the sleeve 36 as shown in FIG. 3, the modified sleeve 36a has a portion within the chamber 56 having an enlarged arcuate section 81 with a peripheral surface 83 complementary to the adjacent surface of the bore 22 and spaced therefrom.

On operation of the switch 13 with the modified sleeve 36a, the shaft 33 is rotated clockwise to the "on" position to move a portion of the arcuate section 81 out of contact with the mercury level. At the same time, the arcuate portion 66 in the chamber 58 is moved into the mercury. This movement effects a simultaneous rise of the mercury level in chamber 58 and a lowering of the mercury level in chamber 56 to provide a maximum differential head in the chambers to cause mercury to flow through the passage 52. The mercury level in the chambers will then equalize to a position through electrode 64 to complete the electrical circuit. On rotation to an "off" position, the same differential head of mercury will occur in reverse to assure electrical continuity of the mercury within the bore 52.

In summary it is seen that the control unit 13 has a circuit breaker defined by the tubular member 51 which functions to automatically break the circuit when excessive current is impressed on the mercury in the bore 52. To re-establish the electrical circuit the mercury must re-unite in the bore 52. This is accomplished by the mercury displacing sections on the rotor 36 which coact with the mercury on the opposite sides of the bore 52 to aid the flow of mercury into the bore 52. The rotatable member of sleeve 36 along with providing for such differential head pressure concurrently acts to disconnect the load from the battery. When the liquid continuity of the mercury has been re-established the circuit is completed. The relative difference in the size of the chambers 56 and 58 in conjunction with the relation of the arcuate sections 66 and 79, thus provides the necessary pressure differential in the chambers 56 and 58 to reunite the mercury in the bore 52, after vaporization, without effecting the ability of the mercury to properly contact the electrodes 62 and 64 in the normal operation of the control unit 13.

Although a preferred embodiment of the invention has been disclosed and described, it is not to be so limited, as alterations and modifications may be made within the full intended scope of the invention as defined in the appended claims.

I claim:
1. An electric switch comprising:
 (a) a stationary housing of insulating material having a bore,
 (b) rotor means positioned in said bore and rotatably mounted on said housing to on and off positions, said rotor means defining with said housing first and second chambers,

(c) an electrically conductive liquid positioned in and partially filling said chambers, (d) a first electrode mounted in said housing and projected into said first chamber in contact with said liquid, (e) a second electrode mounted in said housing and projected into said second chamber and normally out of engagement with said liquid, (f) tubular means of electrically insulative material mounted in said housing and extended between said first and second chambers below the level of the liquid therein, said tubular means having a bore for accommodating a limited amount of said liquid thereby electrically coupling said first and second chambers, and (g) means on said rotor means engageable with the liquid in each of said chambers and operative on rotation of the rotor means to the on position to displace the liquid in the second chamber into engagement with the second electrode thereby electrically coupling the first electrode with the second electrode.

2. The switch defined in claim 1 including:
(a) means coacting with the rotor means and the housing for holding the rotor means in said on and off positions relative to the housing means.

3. The switch defined in claim 1 including:
(a) an inert fluid on top of the liquid in the second chamber.

4. The electric switch defined in claim 1 wherein the means on the rotor means includes:
(a) a first section engageable with the liquid in the first chamber and operative on rotation of the rotor means to the off position to displace the liquid in the first chamber, and
(b) a second section engageable with the liquid in the second chamber and operative on rotation of the rotor means to the on position to displace the liquid in the second chamber into engagement with the second electrode.

5. A circuit breaker for an electric circuit comprising:
(a) a housing of electrically insulative material,
(b) rotor means of electrically insulative material movably mounted within said housing and defining therewith a pair of separate chambers,
(c) separate bodies of electrically conductive liquid positioned in said chambers,
(d) a plurality of electrodes supported by said housing and projected into said chambers,
(e) means of electrically insulative material having a passage positioned below the level of the conductive liquid in said chambers for accommodating said liquid to electrically couple the said electrodes, and
(f) means on said rotor means engageable with the liquid in one of said chambers and operative in response to movement of said rotor means to one operating position therefor to relatively vary the level of the liquid in the chambers into engagement with one of said electrodes,
(g) with the circuit between said chambers being broken when sufficient current to vaporize the liquid in the passage is applied thereto, and being re-established on successive movements of said rotor means from said one operating position to a second operating position, wherein the liquid is disengaged from said one electrode, and from said second operating position to said first operating position.

6. A circuit breaker for an electric circuit comprising:
(a) a housing of electrically insulative material,
(b) rotor means of electrically insulative material movably mounted within said housing and defining therewith a pair of separate chambers,
(c) separate bodies of electrically conductive liquid positioned in said chambers,
(d) means of electrically insulative material having a passage for accommodating said liquid to electrically couple the separate bodies of said liquid whereby the circuit between said chambers will be broken when sufficient current to vaporize the liquid in the passage is applied thereto, said passage being below the level of the liquid bodies in said chambers, and
(e) means on said rotor means engageable with the liquid body, in each of said chambers and operative in response to movement of said rotor means to independently vary the relative level of the liquid bodies in said chambers to re-establish the circuit between said chambers.

7. A circuit breaker for an electric circuit comprising:
(a) separate bodies of electrically conductive liquid,
(b) means of electrically insulative material having a first chamber and a second chamber for separately confining said liquid bodies,
(e) electrodes supported by said means and projected into said housing in engagement with said liquid,
(d) a tubular member of electrically insulative material supported by said means below the level of the liquid bodies in said two chambers, said member having a bore forming a passage between said chambers for accommodating a limited amount of said liquid to electrically couple said chambers whereby the circuit between said chambers will be broken when sufficient current to vaporize the liquid in the bore is applied thereto, and
(e) means positioned in at least one of said chambers movable to engage said liquid to relatively vary the level of the liquid in said two chambers whereby to agitate said liquid to re-establish the amount of liquid in said passage to electrically connect the liquid bodies in said first and second chambers.

8. A switch for an electrical circuit comprising:
(a) two relatively rotatable cooperating members of insulating material having coacting portions to form a pair of closed chambers between said members,
(b) an electrically conductive liquid positioned within the chambers and of a lesser volume than the chambers,
(c) means of electrically insulative material mounted in one of said members below the level of the liquid in the chambers, said means having at least one passage open to each chamber for accommodating a limited amount of said liquid to electrically couple said chambers so that the circuit will be broken when the liquid in the passage is vaporized by a predetermined electric current,
(d) electric circuit terminals on one of said members and communicating with said chambers, and
(e) means on the other of said members engageable with said liquid and operative in response to rotation of said other member relative to said one member to one position, to displace the liquid into contact with both of said terminals whereby to establish electrical connection between said terminals, said liquid, in response to rotation of said other member relative to said one member to another position, being movable out of contact with one of said terminals to disestablish the electrical connection therebetween.

9. A switch for an electrical circuit comprising:
(a) two relatively movable cooperating members of insulating material having coacting portions to form a pair of closed chambers between said members,
(b) an electrically conductive liquid positioned within the chambers and of a lesser volume than the chambers,
(c) means of electrically insulative material mounted in one of said members below the level of the liquid in said chambers, said means having at least one passage open to each chamber for accommodating a limited amount of said liquid to electrically couple said chambers so that the circuit will be broken when the liquid in the passage is separated by a predetermined electric current, (d) electric circuit terminals communicating with each of said chambers, and
(e) means on said members engageable with said liquid and operative in response to relative movement of said members to one moved position therefor to relatively vary the level of the liquid in said chamber to establish electrical connection between said terminals through the liquid in said passage, said liquid, in response to relative movement of said members to a second moved position therefor being movable out of contact with one of said terminals to disestablish the electrical connection therebetween.

References Cited by the Examiner

UNITED STATES PATENTS

| | | | |
|---|---|---|---|
| 2,250,212 | 7/1941 | Suits | 200—152 X |
| 2,580,302 | 12/1951 | Jones | 200—152 |

ROBERT K. SCHAEFER, *Primary Examiner.*

H. HOHAUSER, *Assistant Examiner.*